United States Patent [19]

Goertz

[11] Patent Number: 4,954,154
[45] Date of Patent: Sep. 4, 1990

[54] CONTROLLED RELEASE FERTILIZER GEL COMPOSITION AND PROCESS FOR ITS PRODUCTION

[75] Inventor: Harvey M. Goertz, Marysville, Ohio

[73] Assignee: The O. M. Scott & Sons Company, Marysville, Ohio

[21] Appl. No.: 290,857

[22] Filed: Dec. 27, 1988

Related U.S. Application Data

[63] Continuation of Ser. No. 844,095, Mar. 26, 1986, abandoned.

[51] Int. Cl.$^5$ .............................. C05G 3/02; C05C 9/00
[52] U.S. Cl. .............................................. 71/3; 71/27; 71/28; 71/29; 71/30; 71/64.1
[58] Field of Search ................................. 71/3, 29, 30

[56] References Cited

U.S. PATENT DOCUMENTS

| | | |
|---|---|---|
| 3,076,700 | 2/1963 | Renner . |
| 3,231,363 | 1/1966 | Renner . |
| 3,705,794 | 12/1972 | Czurak et al. . |
| 4,025,329 | 5/1977 | Goertz . |
| 4,089,899 | 5/1978 | Greidinger et al. . |
| 4,173,582 | 11/1979 | Greidinger et al. . |
| 4,298,512 | 11/1981 | Sartoretto et al. . |
| 4,304,588 | 12/1981 | Moore, Jr. ............................. 71/28 |
| 4,332,610 | 6/1982 | Sartoretto et al. . |
| 4,378,238 | 3/1983 | Goertz . |
| 4,530,713 | 7/1985 | Williams ................................. 71/28 |
| 4,599,102 | 7/1986 | Hawkins ................................. 71/30 |

*Primary Examiner*—Ferris H. Lander
*Attorney, Agent, or Firm*—James B. Raden

[57] ABSTRACT

Methylene diurea, either alone or as a component of methylene urea polymers acts as a gelling agent for producing a gel composition capable of suspending particles which are insoluble in a liquid medium. Methylene diurea as the gelling agent in a liquid medium can be used to obtain novel gel compositions in the absence of added thickener-suspending agents. The methylene diurea is present in an amount greater than the solubility limit of methylene diurea in the liquid medium and in an amount sufficient to provide a gel for suspending insoluble particles. The process for producing the gel composition includes subjecting a dry methylene urea composition in particulate form to a shearing action in a liquid medium wherein the methylene urea includes an amount of methylene diurea greater than the solubility limit of methylene diurea in the liquid medium. Controlled release nitrogen fertilizer compositions are obtained which exhibit agronomic advantages over conventional fluid nitrogen fertilizers and offer material handling and application advantages over dry forms of fertilizers.

24 Claims, 8 Drawing Sheets

CONTROLLED RELEASE FERTILIZER GEL COMPOSITION AND PROCESS FOR ITS PRODUCTION

This application is a continuation-in-part, of application Ser. No. 844,095 filed Mar. 26, 1986 and now abandoned.

This invention relates to a novel gelling agent, novel gel compositions prepared without thickener-suspending agents, a controlled release nitrogen fertilizer composition in gel form, and a process for its production.

Background of the Invention

Suspension fertilizers are fertilizers in which solids are held in suspension (prevented from settling) by the use of a suspending agent, usually a swelling type clay. Suspension fertilizers are distinguished from slurry fertilizers in which the solids settle rapidly in the absence of agitation to form a firm layer which is difficult to resuspend. Suspensions are further distinguished from clear liquid fertilizers which contain all nutrients in a totally dissolved state. Suspensions contain nutrients present in excess of their solubility limits as well as totally insoluble materials. This allows for the production of higher fertilizer grades, as well as more varied ratios, and permits the use of less expensive, e.g., less pure, ingredients than is possible with clear liquid fertilizers.

In recent years, the production of suspension fertilizers has grown at a rate faster than any other segment of the fertilizer industry. Factors contributing to this growth are cost and nutrient analysis, as well as uniformity of fertilizer mix, handling advantages, and the option to co-apply with components requiring low application rates. In a good suspension, the mix is uniform throughout the suspension. Unlike dry mix fertilizers, suspensions show little tendency toward nutrient segregation during handling, storage and application. Because they are a fluid mixture of true solutions and small nutrient particles in suspension, the suspension fertilizers can be applied more precisely and uniformly than dry blends of large fertilizer particles. Suspensions offer major handling advantages, as they are dust free and are easily moved by pumping, as contrasted to bagged dry fertilizers which require manual handling. Lastly, suspensions can often act as carriers for primary and secondary elemental agricultural nutrients, micronutrients and pesticides which must be applied at low application rates. These suspensions not only provide for uniform application, but oftentimes eliminate the need for multiple applications.

Suspension fertilizers developed to date are primarily produced with soluble, quick release nutrient sources. These fertilizers can be detrimental to the safety of the crop. All soluble fertilizers can also result in substantial losses to the environment which affects the efficiency of nutrient uptake. Most common nitrogen sources for suspension fertilizers are quite soluble and have high salt indices. The salt index is a measure of the phytotoxicity potential of a fertilizer. The higher the salt index, the greater the potential for plant injury due to dessication i.e., burn. Phytotoxic potential has typically been dealt with by using less than desired quantities of fertilizer, requiring repeated applications, or by restrictions in fertilizer placement. The efficiency of plant uptake by conventional fertilizers can be limited by substantial environmental losses. Because of their high solubility, conventional fertilizers are easily leached under irrigation practices. Furthermore, since the nitrogen is commonly present in the ammoniacal or nitrate form or as urea, there is high potential for additional losses through volatilization or denitrification.

Controlled release nitrogen technologies have been one avenue to decrease environmental loss and correspondingly increase the efficiency of nitrogen uptake by the plant. Because these fertilizers control the rate of nitrogen availability, a much greater proportion is assimilated by the plant rather than lost to the environment. Controlled release N-fertilizers possess low salt indices and are comparatively safe to the plants to which there are applied. Methylene ureas, the condensation product of urea and formaldehyde, represent one type of controlled release fertilizer. These fertilizers have been used primarily in dry granular form. The following table illustrates the relative safety of this type of fertilizer in terms of salt index.

TABLE 1

| Salt Index of Nitrogen Fertilizers | | |
|---|---|---|
| | Salt Index | |
| Fertilizer Source | Per Equal Weights of Materials ($NaNO_3$ = 100) | Per Unit (20#) of Plant Nutrient |
| Ammonium Nitrate | 104.7 | 2.990 |
| Urea | 75.4 | 1.618 |
| Mono Ammonium Phosphate | 29.9 | 0.485 |
| Methylene Ureas-(Polymer Blend)** | 24.6 | 0.610 |
| Methylene Ureas-(Oligomers) | | |
| MDU* | 29.6 | 0.697 |
| DMTU | 6.9 | 0.168 |
| TMTU/TMPU | 6.6 | 0.169 |
| TMPU | 2.1 | 0.055 |

*MDU = methylene diurea; DMTU = dimethylene triurea; TMTU- trimethylene tetraurea; TMPU = tetramethylene pentaurea.
**Commercially available dry granules analyzed as containing: 22.06% Urea, 18.6% MDU, 7.3% DMTU, 18.3% TMTU, and 25.8% TMPU.

In recent years, there has been developed a small class of dispersions made by the in-situ reaction of urea and formaldehyde in an aqueous medium. These dispersions have a low $N-P_2O_5-K_2O$ (hereafter "N-P-K") analysis, for example, an 18-0-0 product which has nitrogen as the only nutrient source. Due to the method of manufacture, the methylene urea polymerization reactions may be incomplete resulting in the presence of unreacted free formaldehyde and unstable intermediates in the final product. The unreacted resin has been a source of human sensitization and is of questionable agronomic value. The low analysis of these products limit the distribution economics of the product. Urea formaldehyde dispersions of this class are represented by U.S. Pat. Nos. 4,298,512 and 4,332,610.

Another class of flowable methylene urea nitrogen fertilizers has been slurried powders. These powders are manufactured by grinding solid methylene ureas to a powder form and slurrying the product into water for spray applications. Distribution economics are improved with this approach since methylene ureas can be shipped in concentrated dry form to the market place where they are slurried. However, once in slurried form, these products must be kept under constant agitation to prevent settling of the solid particles and the clogging of equipment.

Summary of the Invention

It is, accordingly, a primary object of the invention to provide a novel gel composition in which the polymer ingredient itself provides the basis for the gel formation, and the composition is not diluted by the addition of other thickener-suspending agents.

It is another object of this invention to increase the agronomic efficiency of nitrogen fertilizer suspension products.

It is another object of this invention to provide a controlled release nitrogen fertilizer composition in which one of the agriculturally active ingredients of the composition acts as the suspending agent for other agriculturally active ingredients.

It is still another object of the invention to provide a controlled release nitrogen fertilizer composition in which one of the agriculturally active ingredients acts as a carrier for pesticidal formulations.

It is still another object of this invention to provide a novel controlled release nitrogen fertilizer composition which can provide both early initial and long lasting nutrient release in a composition which is relatively uniform and homogeneous and can be applied at consistent delivery rates by conventional fertilizer application equipment.

The additional objects and advantages, and other features of the present invention will become apparent from the appended claims, the following description and the accompanying drawing, in which:

The objects and advantages of the invention are achieved through the use of methylene diurea as a gelling agent and by the formation of a gel composition of a liquid medium and methylene diurea alone or methyleneurea polymers, in the absence of added thickener-suspending agents. In the practice of the invention, methylene diurea, either in a mixture of polymers or alone is to be present in an amount greater than the solubility limit of methylene diurea in the liquid medium and in an amount sufficient to provide a gel structure for suspending the insoluble portion of methylene diurea and other insoluble particles. As referred to herein, a "gel structure" is defined as a well ordered system of solute and solvent molecules with the rigidity of the system normally being supplied by a high degree of hydrogen bonding between the molecules. A standard physical attribute of such a gel structures is thixotropy which is defined as a gel-sol-gel transition. Thixotropy is characterized by substantial changes in viscosity with changing shear rate. Thixotropic compositions also exhibit viscosities which change with time at constant shear as the internal order of the system is decreased, thus producing flowable materials. Gels tend to increase in viscosity on aging as the structure becomes more ordered and rigid, thus requiring more force to disrupt the gel structure. Functionally, the gel structure is utilized to prevent particle settling and to maintain particles in suspension.

Figure 1:
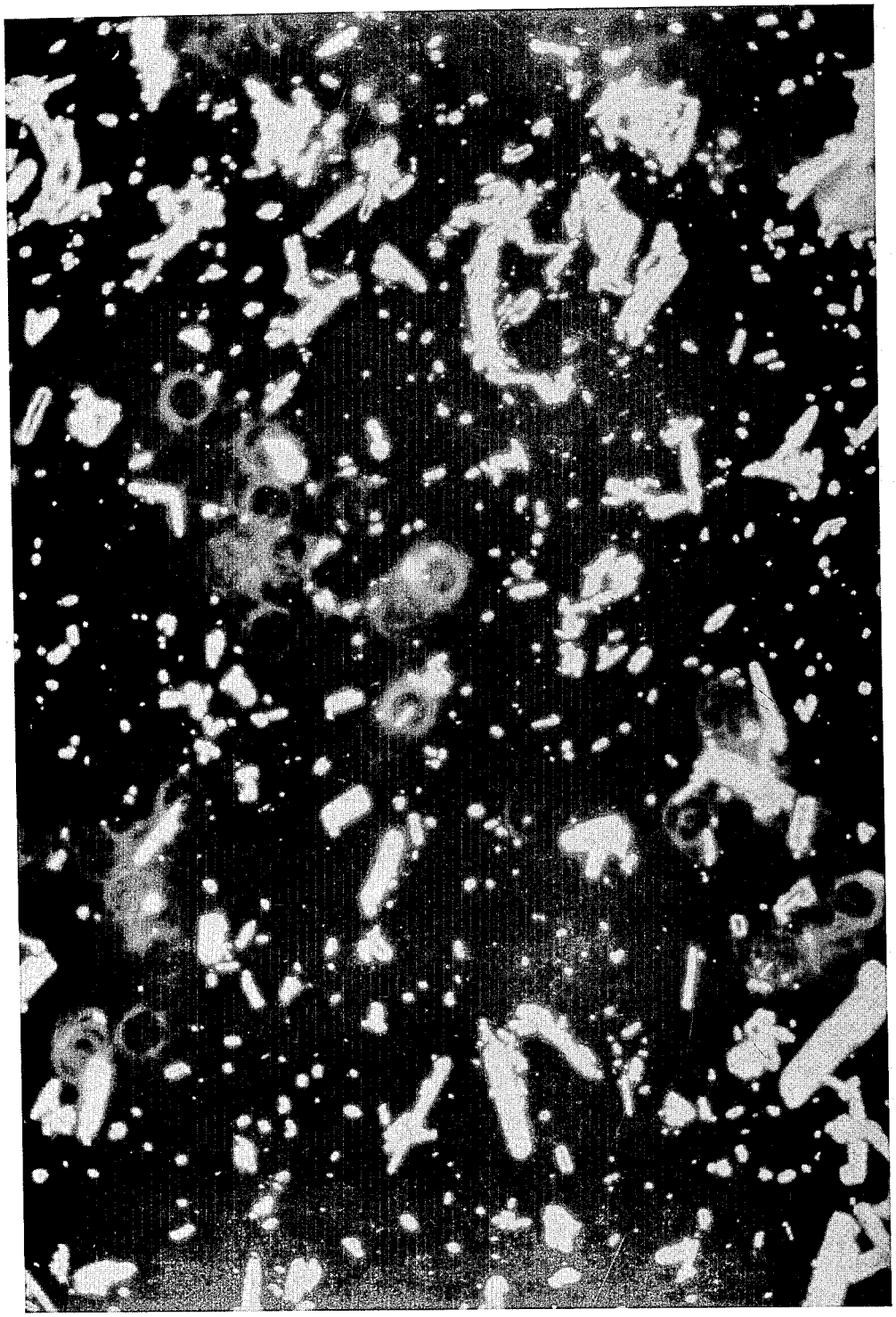
FIG. 1 is a photomicrograph of methylene diurea in distilled water, illustrating a suitable starting material herein in a liquid medium, at 100X magnification.

It has now been discovered that methylene diurea, either alone or in a mixture of methylene urea polymers, such as the mixture obtained as condensation products of urea and formaldehyde, when subjected to shearing action in a liquid medium, can form a gel structure in a gel composition without the addition of thickener-suspending agents, if the methylene diurea is present in a sufficient amount. Furthermore, in a preferred embodiment of this invention, the shearing action is combined with heating of the liquid medium to promote formation of the gel structure. Although methylene diurea by itself, which is illustrated in distilled water at a concentration of 0.104 grams in 1.04 ml of water in the photomicrograph in FIG. 1, can be utilized to form the gel compositions of the present invention, excellent, usable gel compositions are obtained using commercially available methylene urea polymer compositions. Suitable starting material for the gel compositions of the present invention include dry, granular methylene urea compositions described in U.S. Pat. No. 3,705,794, issued to R. H. Czurak, et al. on Dec. 12, 1972, and in U.S. Pat. No. 4,378,238, issued to Harvey M. Goertz on Mar. 29, 1983, which are incorporated herein. These compositions are fully cured urea formaldehyde resins, and contain no measurable amounts of unreacted formaldehyde.

It has been found that methylene diurea in the amount and as processed as described herein enables the formation of a gel composition in the absence of added thickener-suspending agents. By "thickener-suspending agents" are meant those compositions or compounds known to the art, including swelling agents, which have been used to form, assist in the formation of, or to stabilize dispersions against syneresis. Typical of the thickener-suspending agents which can be avoided in the present invention are clays, particularly swelling type clays, vegetable gums such as xanthan gum, and cellulose materials, such as sodium carboxymethyl-cellulose and microcrystalline cellulose.

In the process of the present invention, the dry, granular methylene urea composition is treated in a liquid medium, which can be considered the liquid phase of the composition. The liquid phase can be water or other liquids in which methylene urea is sparingly soluble. As considered herein, the term "soluble" indicates a component or ingredient which dissolves in the liquid medium, or that amount of the component or ingredient which is present up to the solubility limit of the liquid medium. In the case of a "sparingly soluble" component or ingredient, a small portion of the component or ingredient may be soluble, i.e., up to its solubility limit in the liquid medium, but is usually present in a quantity greater than its solubility limit in the liquid medium, and the portion greater than that limit is considered "insoluble" herein. An "insoluble" component or ingredient may have substantially zero solubility in the liquid medium and is considered "insoluble" herein. In addition to water, liquids in which methylene diurea is sparingly soluble, and are therefore useful in the present invention, are particularly exemplified by liquid fertilizers in which methylene diurea is sparingly soluble, such as: urea ammonium nitrate, ammonium polyphosphate, ammonium thiosulfate, ammonium nitrate solutions, urea solutions, ammonium sulfate solutions, phosphoric acid, and super phosphoric acid, and nitrogen solutions, and particularly aqueous solutions thereof.

In order to obtain the gel compositions of the present invention, methylene diurea must be present in an amount greater than the solubility limit of methylene diurea in the liquid medium. The solubility limit of methylene diurea in water has been found to be approximately 2.6 grams per 100 milliliters (ml) of water at 77° F. Based upon this determination, as a guideline it is preferred to have methylene diurea present in the liquid medium in an amount above 2.6 grams per 100 ml of the liquid medium, and preferably substantially above that amount. It is recognized that the solubility limit of methylene diurea in other liquid media will vary above or below its solubility in water depending upon the medium and the concentration if a solution, such as an aqueous solution of the medium. For example, it has been found that the presence of urea in the liquid medium increases the solubility of methylene diurea, and additional amounts of the latter will be required to be in excess of the solubility limit in accordance with the invention. As it is believed that the structure or solid phase of the resulting gel composition is in large part determined by the methylene diurea present, it is more preferred to have an amount of methylene diurea substantially greater than the solubility limit of the methylene diurea in the liquid medium, and in an amount sufficient to provide a gel for suspending insoluble particles therein. As it is desirable to obtain a gel composition which is pourable or flowable, as will be hereinafter defined, it is desirable to have an amount of methylene diurea in the liquid medium sufficient to provide a pourable or flowable gel upon agitation of the gel composition. By experimentation, as a guideline, it has been determined that an amount of methylene diurea in the liquid medium at below approximately 31 grams per 100 ml of liquid medium is preferable to provide a gel composition which is pourable or can be made pourable upon agitation of the gel composition.

The gel compositions of the present invention can be produced by subjecting the dry methylene urea composition in particulate form to a shearing action in the liquid medium. The shearing action in the liquid medium is required, as dry milling, for example by hammer milling or air milling, has been found to be insufficient to provide the products of the present invention. It is believed that reduction of the particle size of the methylene diurea, and hence the dry methylene urea composition containing the methylene diurea, which is the preferred starting material herein, to molecular size achieves the purposes of this invention. Thus, subjecting the methylene urea composition in liquid medium to the shearing action as described herein is believed to reduce the size of the particles to molecular size, whereas dry milling of the same mixture did not produce particles of even submicron size when subsequently added to water, and the resulting composition was not a gel composition of the present invention.

Thus, "shearing action", as defined herein in accordance with this belief is the application of force to particles in a liquid medium. This action increases the solubility in the liquid medium, and hence causes increasing amounts of the component to enter into solution and subsequently permits the crystallization of the component as an insoluble component. Shearing action as applied to methylene diurea particles herein, is the application of sufficient force to the particles in a liquid medium in which the particles are sparingly soluble, to cause a reduction in the size of the particles to molecular size so that increasing amounts of the methylene diurea enters into the solution and subsequently recrystallizes to form a gel composition with the liquid medium.

Where mechanical force is employed to provide the shearing action utilized herein, it has been found that a mechanical force provided by a laboratory blender or a high shear turbine rotating at a speed sufficient to provide a tip speed, i.e. the speed of the paddle or blade at its tip contacting the methylene urea in liquid medium, in the range of above approximately 2,500 feet per minute provides the desired reduction of the methylene diurea particles. Additionally, high speed centrifugal pumps, which provide the desired shearing action, can be utilized to provide the desired particle size reduction. It is recognized that the shearing action to reduce the size of the particles as described herein may be provided by other means, for example, non-mechanical means.

The choice of the apparatus to provide the shearing action does not appear to affect the quality of the gel structure obtained, but may affect the time required to achieve the desired gel composition. The formation of the gel composition can be visually observed with the viscosity of the gel composition increasing with the time the methylene urea composition in liquid medium is subjected to the action. It has been found that the preferred compositions have a viscosity of from about 100 centipoises to about 5,500 centipoises. Gel compositions of the present invention having a viscosity at the lower portion of the range are found to be stable and homogenous and retain their flowability, whereas gel compositions having a viscosity at the upper portion of the range are similarly stable and homogenous, but may tend to be non-flowable when stored, and upon agitation, again become flowable.

Figure 2:
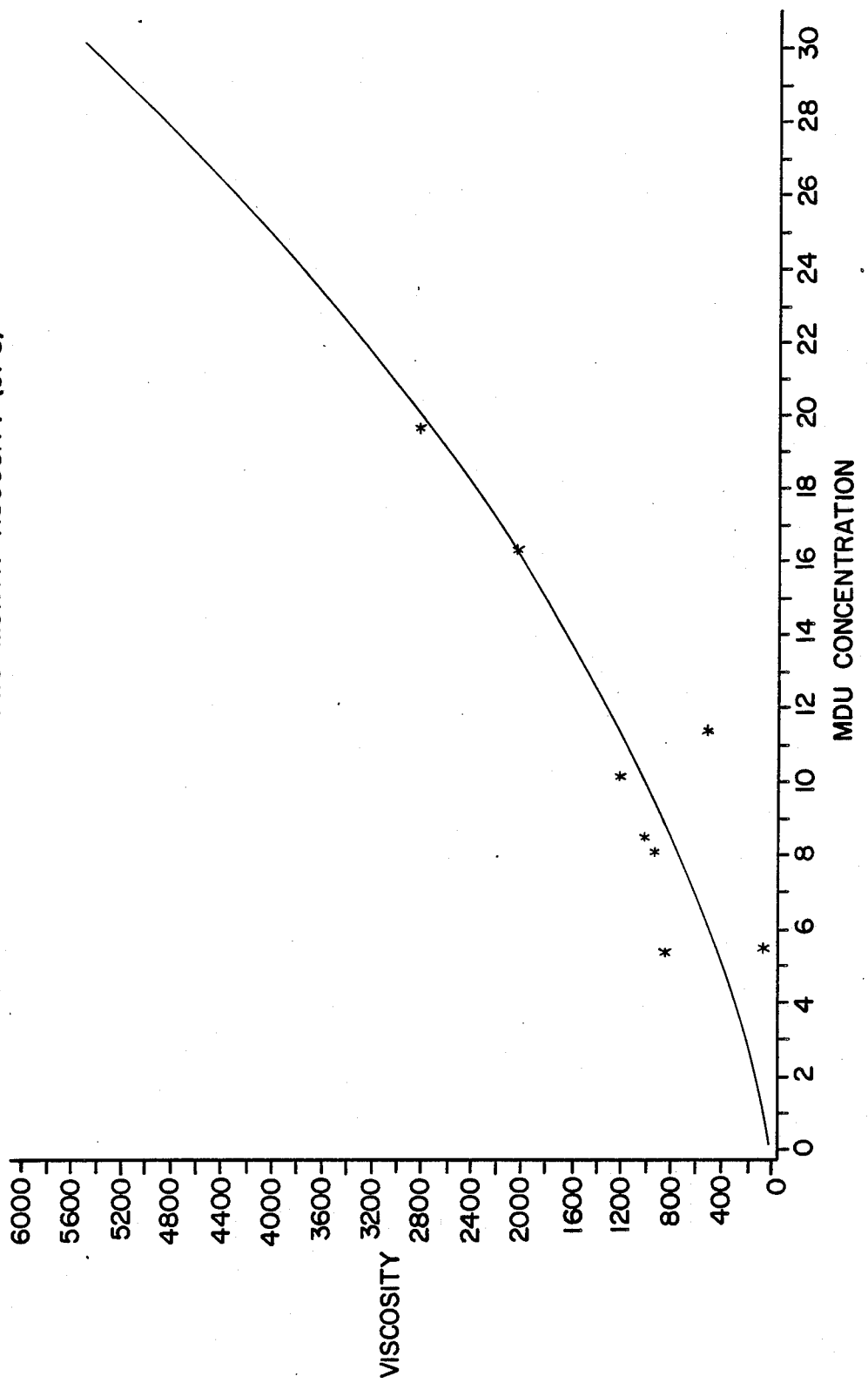
FIGS. 2 and 3 are graphs of methylene diurea concentration in the liquid medium versus viscosity of gel compositions in accordance with the present invention, following preparation of the compositions and two months thereafter, respectively.
Figure 3:
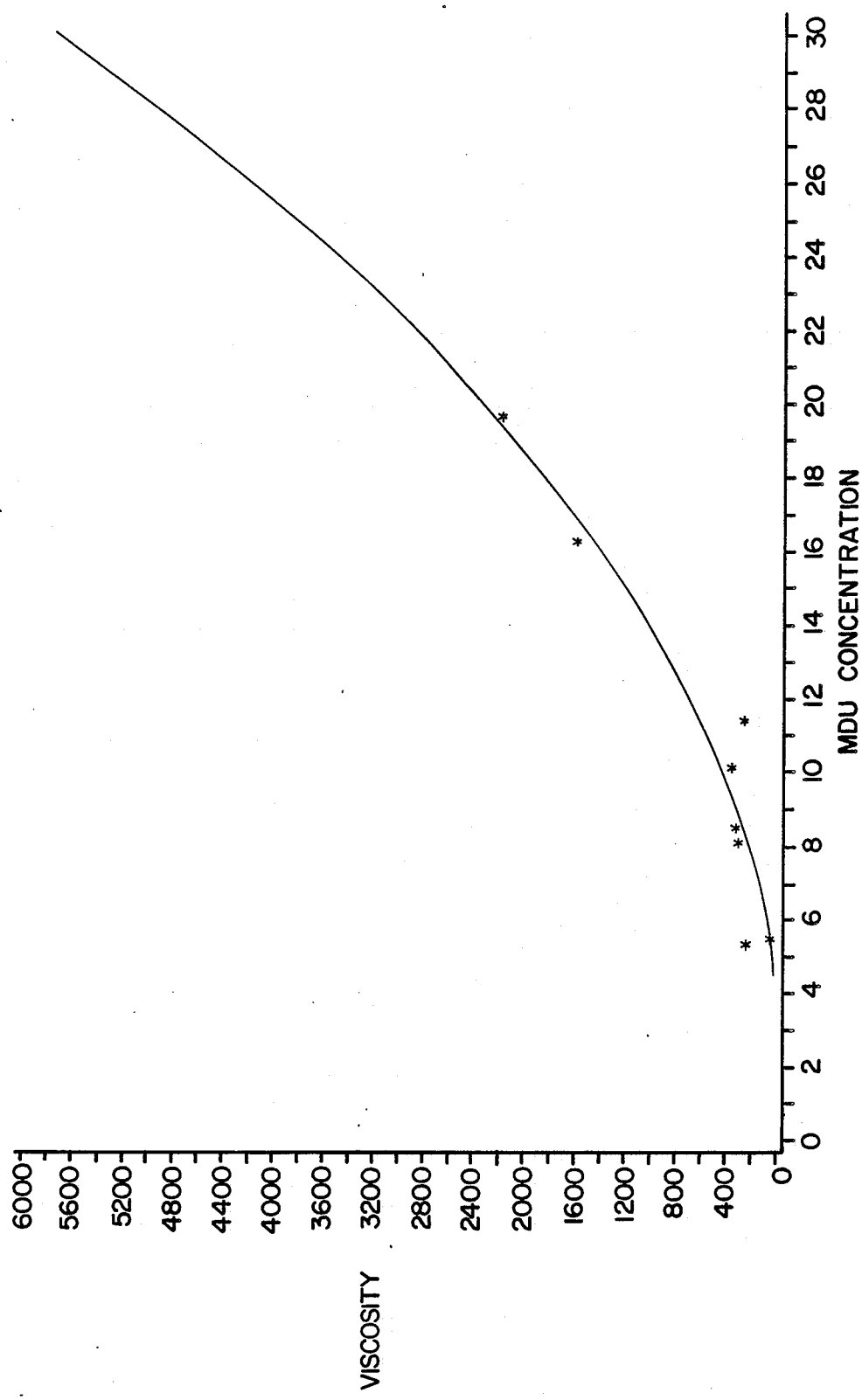

FIG. 2 illustrates the relationship between the amount of methylene diurea in the composition and the viscosity of the composition following halting of the shearing action, while FIG. 3 illustrates the same relationship after the compositions have been stored for two months. In these figures, the concentration of methylene diurea (MDU) is shown in grams of methylene diurea per 100 grams of liquid phase, i.e. of liquid medium; and the viscosity of the composition is expressed in centipoises.

The viscosity of the gel composition produced in accordance with the present invention will increase with increased processing temperature. The apparatus for providing shearing action, particularly mechanical apparatus therefor, will usually cause an increase in the temperature of the composition as the shearing action progresses. Thus, while temperature of processing, like the time of processing, affects the viscosity of the gel composition, these factors can be readily controlled by observing the change in or measuring the viscosity of the composition during processing. However, it is to be noted that in order to enhance the formation of a gel structure in the gel compositions of this invention, it is preferred to subject the liquid medium containing a requisite amount of methylene diurea to a combination of both shearing action and heating.

It is believed that the gelling agent of the present invention and the gel compositions produced therewith, occur due to the limited solubility of methylene diurea in the liquid medium. The shearing action heretofore defined is believed to reduce the particle size of the dry polymer particles, thereby maximizing the solid/liquid interfacial area. In accordance with this theory, as the particle size decreases to molecular size, increasing portions of methylene diurea in contact with the liquid medium dissolve into solution, creating an equilibrium with the solid phase of particles of methylene diurea and other insoluble portions of ingredients or insoluble ingredients. In this equilibrium, it is believed that methylene diurea molecules are continually going into solution and crystallizing out of solution into the solid phase. The crystals thus formed are believed to create a lattice framework or gel structure which entraps other solid particles, preventing the latter structure from settling. The lattice framework or gel structure continues to prevent the solid particles from settling upon storage of the composition, although if the composition is sufficiently viscous, the composition will not be pourable or flowable. However, upon agitation of the composition, it is believed that the lattice framework is broken, which reduces the apparent viscosity and allows movement, such as the flowing of the composition, and permits its application as if it were a liquid, for example by spraying.

Figure 5:
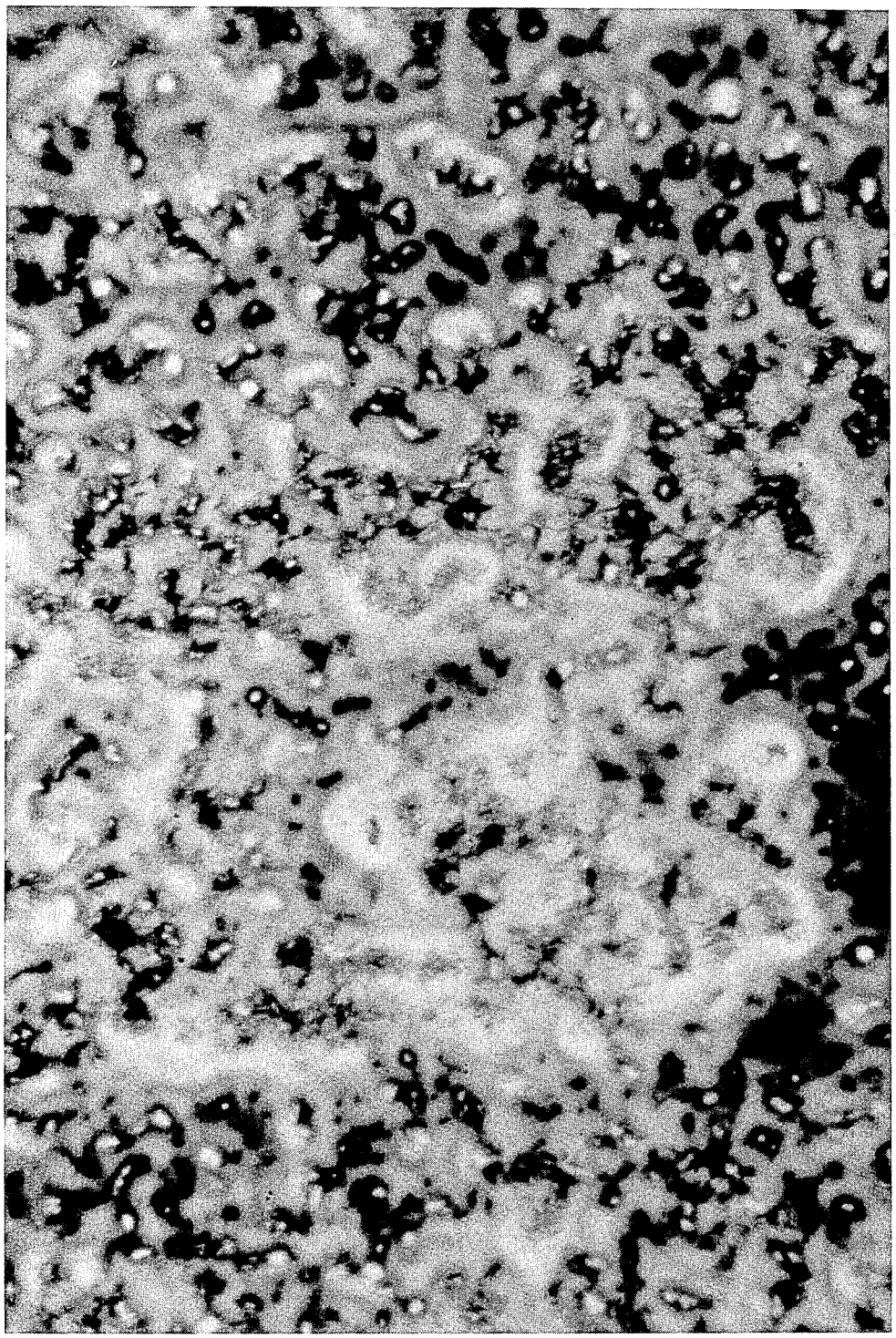
FIG. 5 is a photomicrograph of a gel composition of the present invention containing particles of insoluble components, at 450X magnification.
Figure 6:
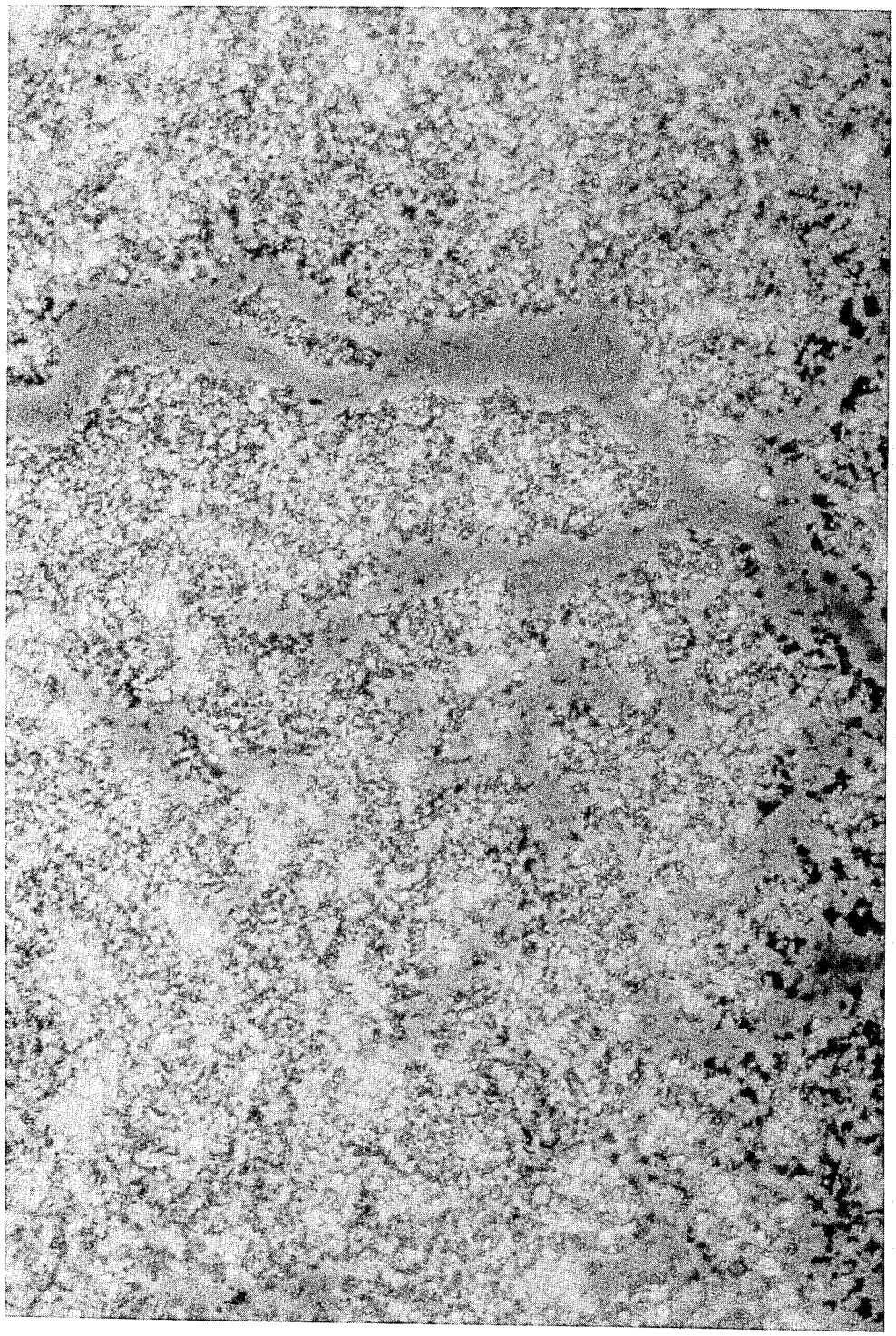
FIG. 6 is a photomicrograph of another gel composition of the present invention containing particles of insoluble components, at 450X magnification.
Figure 7:
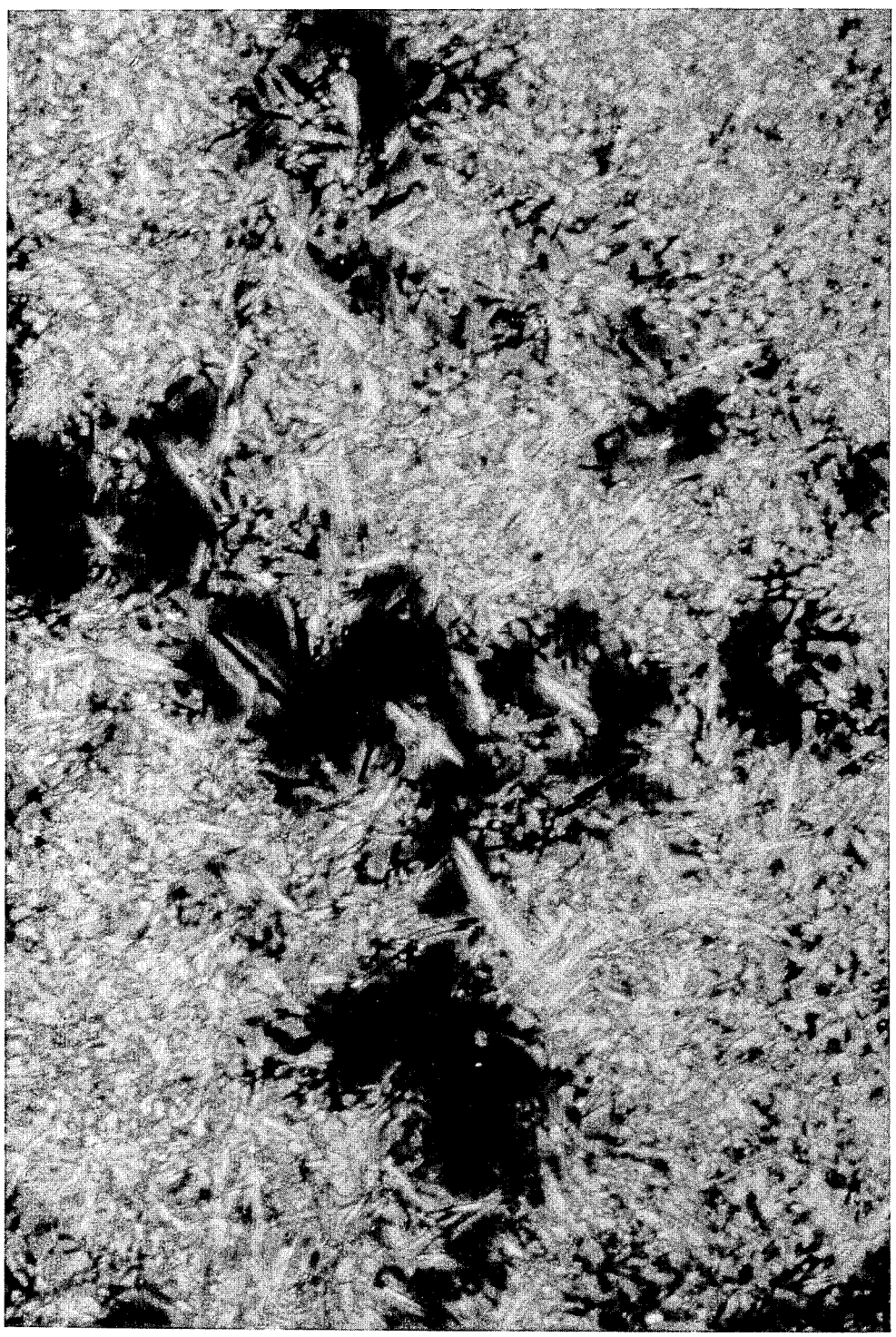
FIG. 7 is a photomicrograph of another gel composition of the present invention, at 450X magnification.

The belief that the methylene diurea particles, either alone, or in a blend of methylene urea polymers upon processing in accordance with the present invention enter into solution and crystallize out of solution as a solid phase creating a lattice framework, is shown in the photomicrographs in FIGS. 5-7. These photomicrographs of compositions of the present invention are prepared from commercially available methylene urea granular compositions and liquid media, which are as described herein and which, will be described in further detail In accordance with the present invention, a gelling agent for producing a gel composition capable of suspending particles which are insoluble in a liquid medium, is obtained by providing methylene diurea capable of being reduced to molecular size in a liquid medium in an amount greater than the solubility limit of methylene diurea in the liquid medium. The gelling agent can be utilized in the same manner that swelling clays, for example montmorillonite clay, are utilized to form suspensions of other ingredients which are insoluble in the liquid medium. The gelling agent of the invention is particularly useful in preparing agriculturally active suspensions, as the methylene diurea gelling agent is itself agriculturally active as a source of controlled release nitrogen.

The controlled release fertilizer gel composition of the present invention is particularly useful, is agronomically advantageous, and results in reduced loss to the environment as compared to the conventional liquid fertilizers. In addition, the fertilizer gel composition of the invention provides advantages in material handling and in application over dry forms of fertilizer. Moreover, as the release of nitrogen from the fertilizer gel composition described herein is controlled, the fertilizer possesses a low salt index and is found to be very safe to the plants to which they are applied.

These controlled release fertilizer gel compositions are advantageous as they permit the development of prescription fertilizer formulas tailored to the nutrient requirements of the crop and the nutrient deficiencies of the soil. In this regard, the insoluble or solid phase of the composition can include virtually any agricultural chemical, ranging from insoluble methylene urea polymers, to agriculturally active phosphorus and potassium, and secondary nutrients, micronutrients, pesticidal materials, such as herbicides and fungicides, and the like.

The fertilizer gel compositions are also particularly useful in the production and application of base suspensions. "Base suspensions", as used herein, are compositions of the present invention which can be stored over long periods of time, and then can be applied as the final fertilizer composition, or can be blended with additional materials shortly before application. By utilizing agitation prior to application, these compositions, even after long periods of storage, become flowable or pourable, and can be applied as a liquid fertilizer, for example by various application techniques which may range from boom spray application, to soil injection, to strip band dribble, to fertigation, i.e., application through irrigation systems.

Figure 4:
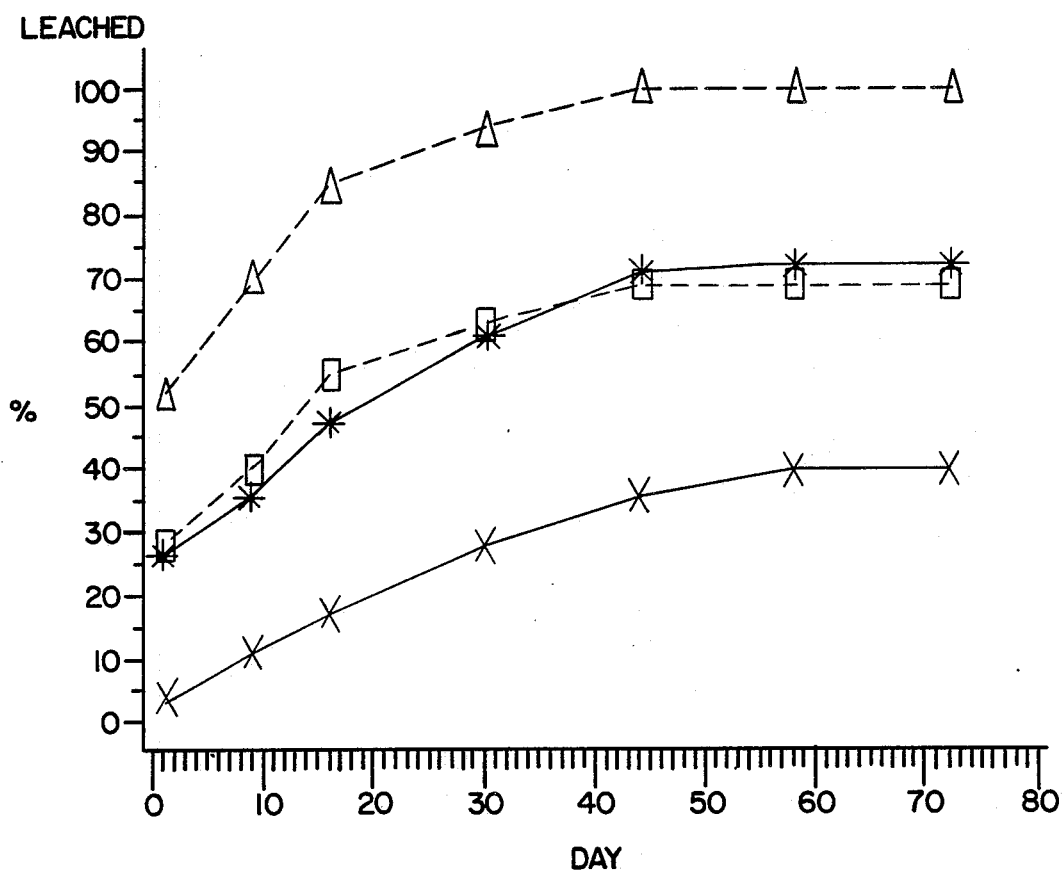
FIG. 4 is a graph showing the leaching rates of several nitrogen sources, from a fallow soil, including methylene diurea, dimethylene triurea, a blend of methylene urea polymers, and urea, as the nitrogen sources.

Application of these compositions, particularly through fertigation, is particularly useful in applications which have previously recognized the value of controlled release nitrogen in fertilization. For example, the compositions are particularly useful in turf fertilization, including lawn care service by liquid spray application and in fertilization of golf courses by fertigation. Ornamental plant production additionally utilizes fertigation as a labor saving means of metering nutrients to the plants, and while with previously utilized fertilizers a large portion of the nutrients were leached to the environment, application of the compositions of the present invention significantly reduce the loss to the environment through leaching while being particularly amicable to the metering of nutrients by fertigation. The significant reduction of the loss of nutrients through leaching is illustrated in FIG. 4 of the drawing, wherein urea was found to have the highest leaching rate, methylene diurea (MDU) and dimethylene triurea (DMTU) the next highest, but considerably lower leaching rate, and a blend of methylene urea polymers having the lowest leaching rate.

Detailed Description of Preferred Embodiments

The following examples are illustrative of the practice of the invention and of the gel compositions, controlled release fertilizer compositions and process of the present invention. All parts and percentages are by weight unless otherwise indicated.

EXAMPLE 1

A controlled release fertilizer composition in gel form was prepared from the following ingredients in the indicated amounts:

| | |
|---|---|
| Water | 192.04 lbs. |
| Ammonium polyphosphate | 23.06 lbs. |
| Urea | 66.44 lbs. |
| Methylene urea* | 77.56 lbs. |
| Potassium chloride | 44.00 lbs. |

*reaction product of urea and formaldehyde prepared in accordance with my U.S. Pat. No. 4,025,329 from a urea-formaldehyde concentrate, such as UFC-85, which is supplied by Georgia-Pacific Corporation, Atlanta, Georgia U.S.A., and contains approximately 25 percent urea and 60 percent formaldehyde.

The reaction product, as dry granules, contained the following as a percentage by weight in the starting material:

| | |
|---|---|
| Urea | 14.32% |
| Methylene Diurea | 14.93% |
| Dimethylene Triurea | 11.21% |
| TMTU | 21.47% |
| TMPU | 38.07% |

TMTU = trimethylene tetraurea; TMPU = tetramethylene pentaurea.

The liquid phase comprising the water and polyphosphate were added to a 40 gallon mixer equipped with a 20 horsepower high shear turbine. The urea was added with the turbine rotating at 2100 rpm (5000 ft. per minute tip speed). The dissolution of the urea in the liquid phase decreased the temperature from 70° F. to 60° F., at which time the dry granular methylene urea was added with continued high shear turbine rotation. After 10 minutes, the potassium chloride was added to the mixer. The high shear turbine rotation was continued for a total of 45 minutes. The resulting gel composition had a viscosity of 240 centipoises and an average particle size of 4.5 microns. After two months the composition had a viscosity of 848 centipoises. The controlled released gel composition thus prepared was a 16-2-6 N-P-K controlled release fertilizer designed for turf applications, deriving approximately 30% of its nitrogen from controlled release sources in the composition.

EXAMPLES 2-9

Eight gel compositions were prepared using the same technique as in Example 1, but with varied amounts of methylene diurea in each formulation. Upon processing each of the formulations as indicated in Example 1, suitable gel compositions were obtained in Examples 3-9, but as the amount of urea in proportion to the amount of methylene diurea in Example 2 was quite high, the solubility of the latter was increased so that insufficient methylene diurea was present, and a stable homogeneous gel composition was not formed. Example 4 is the same as Example 1 above. The viscosity of the resultant compositions obtained, and the urea and methylene diurea content of each example are as follows:

| Example | Urea | MDU | Viscosity Initial | Viscosity 2 Months |
|---|---|---|---|---|
| 2 | 45.7 | 5.5 | 44 | 80 |
| 3 | 47.8 | 11.4 | 252 | 528 |
| 4 | 36.5 | 5.3 | 240 | 848 |
| 5 | 38.7 | 8.1 | 297 | 936 |
| 6 | 38.9 | 8.5 | 319 | 1004 |
| 7 | 45.8 | 10.1 | 348 | 1208 |
| 8 | 40.9 | 16.3 | 1584 | 2048 |
| 9 | 34.1 | 19.7 | 2182 | 2822 |

Urea and methylene diurea content (MDU) expressed in grams per 100 grams liquid, and viscosity measured in centipoises.

Example 2 never attained adequate viscosity to suspend the insoluble portion of the formulation. Examples 3-9 formed stable gel compositions which retained insoluble components in suspension.

EXAMPLES 10-15

Illustrative of the use of the gelling agent of the present invention to form stable compositions with liquids other than water, and particularly with common agricultural liquid fertilizers, compositions were prepared using a methylene urea reaction product, as dry granules, containing the following percentage by weight:

| | |
|---|---|
| Urea | 43.0% |
| Methylene Diurea | 19.0% |
| Dimethylene triurea | 5.0% |
| TMTU | 15.0% |
| TMPU | 18.0% |

TMTU = trimethylene tetraurea; TMPU = tetramethylene pentaurea and the following liquid ingredients in the proportion indicated below:

| Example | Liquid | % Liquid | % Methylene Urea |
|---|---|---|---|
| 10 | Urea Ammonium Nitrate (UAN) | 70 | 30 |
| 11 | Ammonium Polyphosphate (APP) | 80 | 20 |
| 12 | Ammonium Thiosulfate (ATS) | 70 | 30 |
| 13 | Ammonium Nitrate (AN) | 70 | 30 |
| 14 | Ammonium Sulfate (AS) | 75 | 25 |
| 15 | Phosphoric Acid (PA) | 65 | 35 |

Processing as set forth in Example 1 using an Oster Blender for 5 minutes having an impeller tip speed of 5367 feet per minute, yielded stable gel compositions having the following N-P-K analysis and percent controlled release nitrogen, with the analysis of the liquid medium being shown for comparison:

| Example | N-P-K-S Analysis Liquid Medium | N-P-K-S* Analysis Composition | % of Nitrogen as Controlled Release |
|---|---|---|---|
| 10 | UAN 32-0-0 | 34-0-0 | 24 |
| 11 | APP 10-34-0 | 16-27-0 | 35 |
| 12 | ATS 12-0-0-26 | 20-0-0-18 | 41 |
| 13 | AN 20-0-0 | 26-0-0 | 32 |
| 14 | AS 8-0-0-9 | 16-0-0-7 | 44 |
| 15 | PA 0-54-0 | 14-35-0 | 70 |

*N-P-K-S = N-$P_2O_5$-$K_2O$-S analysis

As heretofore noted, the analysis of the final product can be tailored for a specific application to include additional amounts of primary nutrients, secondary nutrients such as calcium, magnesium and sulfur, and micronutrients such as zinc, copper, iron, manganese, molybdenum and boron, by incorporating compounds containing these elements, as will be hereinafter exemplified.

EXAMPLE 16

The relationship of the processing temperature to the viscosity and gelling of the composition was illustrated by measuring the temperature, visually observing the composition, and determining the viscosity of the composition periodically during processing. In this example, 96 lbs. of methylene urea reaction product, as dry granules, containing the following in percentage by weight:

| | |
|---|---|
| Urea | 36.97% |
| Methylene Diurea | 22.83% |
| Dimethylene Triurea | 8.21% |
| TMTU | 10.06% |

| -continued | |
|---|---|
| TMPU | 21.93% |

TMTU = trimethylene tetraurea; TMPU = tetramethylene pentaurea and 224 lbs. of urea ammonium nitrate solution having a N-P-K concentration of 32-0-0, was placed in a 40 gallon Bard Vac-U-Max high shear blender. The temperature of the mixture was initially recorded. Thereafter, at ten minute intervals, one quart samples were withdrawn and the temperature measured. The viscosity of each sample was determined after cooling using a Brookfield Viscometer. The temperature of the contents of the blender and the viscosity of the samples are presented below:

| Sample | Temperature °F. | Viscosity Cps at 25° C. |
|---|---|---|
| Initial (0 min.) | 66 | 0 |
| 10 minutes | 88 | 1700 |
| 20 minutes | 120 | 3150 |
| 30 minutes | 148 | 4800 |
| 40 minutes | 172 | Not measureable |

The temperature increase occurred due to the shearing action, and no external heat was applied. The viscosity and gelling is believed to be obtained due to the increase in solubility of the methylene diurea in the polymer blend through the shearing action and the increase in temperature.

EXAMPLE 17-19

The necessity of the shearing action in forming the gelling agents and gel compositions of the present invention is demonstrated in Examples 17-19 wherein the same dry granular methylene diurea was differently processed and the resultant mixtures or composition visually observed and their viscosity measured.

EXAMPLE 17

In this example, 175 grams of the methylene urea reaction product described in Example 16 was hammer milled and placed with 525 grams of distilled water in a ml beaker. The ingredients were stirred with moderate agitation for five minutes. The solid particles dispersed with slow stirring, and settled after the stirring was halted. The average particle size of the insoluble portion was determined to be approximately 100 microns. The resultant mixture appeared to duplicate the commercially available methylene urea fertilizer in powder form which is mixed with water in a tank for spray application, and began to settle following halting of the agitation.

EXAMPLE 18

In this example, 175 grams of the methylene urea specified in the preceding example was air milled and placed with 525 grams of distilled water in a 600 ml beaker. The mixture was stirred with moderate agitation for five minutes. The particles of air milled methylene urea, which had a particle size of 4-5 microns, dispersed in the water with agitation, but slowly settled following halting of the agitation.

EXAMPLE 19

In this example, 175 grams of the methylene urea specified in the two preceding examples were placed in 525 grams of distilled water in a Ross Laboratory blender. The blender was actuated for five minutes. The blender was determined to have a tip speed of 2,663 feet per minute. The resulting composition was a gel composition in accordance with the present invention, as noted below:

The viscosity of the mixtures or composition obtained in Examples 17-19 was determined with a Brookfield Viscometer after blending, and the rate of settling out of each mixture or composition was recorded as the percent of clear solution at the time intervals noted below:

| Example | Viscosity Cps at 25° C. | % of Clear Solution After | | | |
|---|---|---|---|---|---|
| | | ½ hr. | 1 hr. | 1 ½ hrs. | 2 hrs. |
| 17 | 20 | 44.1 | 50.0 | 50.0 | 52.9 |
| 18 | 20 | 8.8 | 20.6 | 26.5 | 32.4 |
| 19 | 510 | 0.0 | 0.0 | 0.0 | 0.0 |

Examples 17-19 demonstrate that the formation of a homogeneous gel, and obtaining a viscosity within the desired range is obtained only upon the methylene urea being subjected to shearing in a liquid media in which methylene diurea is only sparingly soluble.

EXAMPLE 20

This example illustrates the manufacture of the gel composition of the present invention in commercial equipment, and the use of a common agricultural liquid fertilizer as the liquid medium for the composition. The composition was manufactured in a Vac-U-Max 60-1600-30 blender, which is a 1600 gallon mixing vat equipped with a 60 horsepower high shear turbine and a 30 horsepower centrifugal recirculating pump. 7200 lbs. of urea ammonium nitrate solution, at a N-P-K analysis of 32-0-0 was pumped into the vat. The high shear turbine was actuated and 2800 lbs. of dry methylene urea of the composition defined in Example 1 were added by conveyor to the top of the mixing vat at a rate of 133 lbs. per minute. The contents of the vat were mixed under high shear for a total of two hours. At the end of this time, the viscosity of the resultant composition was sufficient to hold particulate matter in suspension and of a particle size suitable for injection into irrigation systems. The contents of the vat were pumped to a storage tank, where it was held successfully for four months without settling. The viscosity of the composition was determined to be 900 centipoises with a particle size of 99% of the composition smaller than 45 microns. The product was analyzed to have a N-P-K analysis of 34-0-0 with 20% of the total nitrogen derived from methylene urea polymers.

EXAMPLE 21

This example illustrates the capability of the gel compositions of the present invention to create prescription fertilizer formulas, i.e. formulas tailored to the needs of specific plants and soil conditions. The particular composition noted below was created to meet the nutrient requirements for potato production in a particular soil, and was designed to have the following fertilizer requirements:

| Nutrient | Pounds per Acre |
|---|---|
| N | 100.00 |
| $P_2O_5$ | 80.00 |
| $K_2O$ | 150.00 |

-continued

| Nutrient | Pounds per Acre |
|---|---|
| S | 30.00 |
| Zn | 5.00 |
| Cu | 1.00 |
| Fe | 1.65 |
| B | 0.50 |

As in the previous example, the composition was manufactured in a Vac-U-Max 60-1600-30 blender. The ingredients and order of their addition to the vat were as follows:

| | |
|---|---|
| Water | 544 lbs. |
| APP 10-30-0 | 3,280 lbs. |
| AS 8-0-0-9 | 4,100 lbs. |
| Methylene Urea | 1,400 lbs. |
| KCl | 3,075 lbs. |
| Ferrous sulfate (20% Fe) | 101 lbs. |
| Solubor (20.5% B) | 30 lbs. |
| Copper Sulfate (25% Cu) | 49 lbs. |
| Zinc sulfate (36% Zn) | 171 lbs. |

The first three ingredients were added to the mixer with the turbine agitator rotating The methylene urea was added via a conveyor at the rate indicated in the previous example. After 30 minutes, the viscosity of the composition was sufficient to prevent settling of the particulates. At this time, the potassium chloride was added via the conveyor, and the micronutrients were added by means of an eductor in the recirculation loop. The total processing time was approximately 40 minutes. Due to the short processing time, quantities of large (30 mesh) methylene urea particles were visible in the composition. The composition was successfully applied through soil injection equipment in a pre-plant application to potatoes.

EXAMPLE 22

This example illustrates the agronomic advantage of the controlled release fertilizer compositions of the present invention over conventional fertilizers containing no controlled release nitrogen. The compositions produced in Examples 20 and 21 were utilized in a potato trial involving both preplant fertilizer application as well as "fertigation", the application of fertilizer through an irrigation system. The test comprised three treatments as follows: In Treatment 1, the controlled release composition of Example 21 was utilized in a preplant application and the controlled release composition of Example 20 applied by fertigation. In Treatment 2 the fertigation application was the same as in Treatment 1, but urea ammonium nitrate solution (32-0-0 analysis) was substituted for methylene urea in the formula of of Example 21. Treatment 3 was the grower's standard fertilization practice, and utilized no controlled release nitrogen. In this treatment urea ammonium nitrate (32-0-0 analysis) was utilized instead of methylene urea in both the preplant and fertigation applications. The improvement using the methylene urea controlled release nitrogen compositions in accordance with the present invention on total yield and grade is presented below:

| | Treatment | | |
|---|---|---|---|
| | 1 | 2 | 3 |
| Methylene Urea | | | |
| Preplant (100 lbN/acre) | yes | no | no |
| Fertigation (62.5 lbN/acre) | yes | yes | no |
| Yield (cwt/acre)* | 603 | 541 | 419 |
| Grade (Percent) | | | |
| Cartons | 53.5 | 34.8 | 13.8 |
| 10's | 32.5 | 39.7 | 41.7 |
| B's | 12.7 | 22.7 | 35.8 |
| Culls | 1.2 | 2.8 | 8.7 |

*Field weights.

EXAMPLE 23

To demonstrate the amount of methylene diurea required to form the compositions of the present invention, samples of the formulation of Example 1 were diluted with water prior to processing with the shearing action applied by means of the Ross blender described in Example 19. The dilution factor, the methylene diurea concentration, and the viscosity of the resultant mixture or composition, and the amount of settling therein after two hours, is shown below:

| Sample | Dilution Factor | MDU | Viscosity | Settling (2 hrs.) |
|---|---|---|---|---|
| 1 | 50% | 1.88 | 1 | 12.5 |
| 2 | 37% | 2.54 | 120 | 0.0 |
| 3 | 25% | 3.31 | 130 | 0.0 |
| 4 | 12% | 4.23 | 350 | 0.0 |
| 5 | 0% | 5.34 | 700* | 0.0 |

MDU = concentration in grams per 100 grams liquid, viscosity in Cps.
*Viscosity after four months.

Samples of gel compositions of the present invention were examined under a microscope to demonstrate recrystallization of methylene diurea to the lattice framework in accordance with this invention. Methylene urea, as set forth in Example 9, was formulated and prepared in accordance with Example 1 at room temperature, and a representative portion of the resultant composition was placed on a slide. A photomicrograph thereof is shown in FIG. 5. Another source of methylene urea, as set forth in Example 6, was formulated and prepared in accordance with Example 1 at room temperature, and a representative portion of the resultant composition was placed on a slide. A photomicrograph thereof is shown in FIG. 6. It is noted that the lattice framework in the composition shown in FIG. 6 consisted mostly of fine particles in the order of from about 0.5 to 3 microns, whereas the lattice framework of the composition shown in FIG. 5 consisted of a mixture of intermediate and small particles. The difference in the size of the particles is believed to result from the difference in the amount of methylene diurea as compared to urea in the starting material and liquid medium, with the higher concentration yielding larger particles following processing. Methylene urea, again as set forth in Example 9, was processed in accordance with Example 1, except that the temperature of the blending material was heated to approximately 120° F., and after processing, slowly cooled. A representative portion of the resultant composition was placed on a slide, and a photomicrograph thereof in shown in FIG. 7. The lattice framework of the composition included extensive formation of needle-like structures approximately 1–30 microns in length, the needle-like structures being similar to those formed (but without the lattice structure) when pure methylene diurea was heated in distilled water without the application of shearing action, and then rapidly cooled.

In order to determine pourability as discussed herein, as a measure of whether or not a composition can be pumped or treated as a liquid, the following test was utilized: samples stored in 8-16 ounce sample bottles were stirred twice with a stirring rod around the inside surface of the container. The container is then inverted downward at a 45° angle for two minutes. The percent by volume of the composition which flows out of the container in one minute is utilized as the pourability index of the material. Suitable pourability of the gel compositions of the present invention was determined upon at least 85% of the composition flowing out of the container within one minute.

The invention has been illustrated with specific examples of fertilizer compositions. In addition, the invention also resides in the gelling agent provided by methylene diurea and methylene urea compositions which provide gel compositions upon processing as indicated herein. The invention also resides in gel compositions useful to suspend insoluble ingredients for improved flowability and for other purposes. The controlled release fertilizer gel compositions of the invention are particularly useful as a means of conveying many other nutrients, as well as micronutrients, and control chemicals such herbicides, fungicides and insecticides suspended in the composition for flowable application desired. Examples of other ingredients are shown in the aforementioned U.S. patents, the disclosures of which are hereby incorporated by reference. Other pesticides which may be used are shown in the Pesticide Manual, 6th Edition, British Crop Protection Counsel 1980. Other herbicides which may be used are shown in Weed Control 2d Edition, 1962 Robbins et al., McGraw-Hill Book Company, Inc., New York, NY. Other fertilizer nutrients which may be used in combination are shown in Commercial Fertilizers, 5th Edition, 1955, Collings, McGraw-Hill Book, Inc., New York, NY.

What is claimed is:

1. A gel composition comprising:
a gel structure formed by subjecting a liquid medium containing particulate methylene urea polymers in the absence of added thickener - suspending agents to a shearing action, said shearing action comprising the application of force to the particles in said liquid medium,
said methylene urea polymers in said liquid medium including methylene diurea particles in an amount greater than the solubility limit of methylene diurea in the liquid medium and in an amount sufficient, upon subjecting said methylene diurea particles in said liquid medium to said shearing action, to provide a gel structure for suspending insoluble particles therein,
and said methylene diurea particles being subjected to sufficient force by said shearing action to cause a reduction of the size of the methylene diurea particles to molecular size whereby the methylene diurea enters into solution and subsequently recrystallizes from said liquid medium substantially in crystalline form to form said gel structure with said liquid medium.

2. The gel composition as defined in claim 1 wherein the amount of methylene diurea is sufficient to provide a pourable gel upon agitation of said gel composition.

3. The gel composition as defined in claim 1 wherein said composition contains particles which are insoluble in said liquid medium and which are suspended in said composition.

4. The gel composition as defined in claim 1 wherein said composition contains at least one component in addition to methylene diurea and which is insoluble in said liquid medium.

5. The gel composition as defined in claim 1 wherein said shearing action is combined with heating of the liquid medium to promote formation of the gel structure.

6. A controlled release nitrogen fertilizer gel composition, comprising:
a gel structure formed by subjecting a liquid medium containing particulate methylene urea polymers in the absence of added thickener - suspending agents to a shearing action, said shearing action comprising the application of force to the particles in said liquid medium,
said methylene urea polymers in said liquid medium including methylene diurea particles in an amount greater than the solubility limit of methylene diurea in the liquid medium and in an amount sufficient, upon subjecting said methylene diurea particles in said liquid medium to said shearing action, to provide a gel structure for suspending the amount of methylene diurea above the solubility limit and insoluble particles in said gel structure,
and said methylene diurea particles being subjected to sufficient force by said shearing action to cause a reduction of the size of the methylene diurea particles to molecular size whereby the methylene diurea enters into solution and subsequently recrystallizes from said liquid medium substantially in crystalline form to form said gel structure with said liquid medium.

7. The controlled release nitrogen fertilizer gel composition as defined in claim 6 wherein said liquid medium is selected from the group consisting of water, water and urea, aqueous urea ammonium nitrate solution, aqueous ammonium polyphosphate solution, aqueous ammonium thiosulfate solution, aqueous ammonium nitrate solution, aqueous ammonium sulfate solution, phosphoric acid, superphosphoric acid, and mixtures thereof.

8. The controlled release nitrogen fertilizer gel composition as defined in claim 6 wherein said composition includes at least one agriculturally active ingredient suspended in said gel composition, said ingredient being insoluble in said liquid medium.

9. The controlled release nitrogen fertilizer gel composition as defined in claim 6 wherein said composition includes at least one methylene urea polymer in addition to methylene diurea and which is at least substantially insoluble in said liquid medium.

10. The controlled release nitrogen fertilizer gel composition as defined in claim 6 wherein said composition includes at least one agricultural potassium source suspended therein.

11. The controlled release nitrogen fertilizer gel composition as defined in claim 6 wherein said composition includes at least one agricultural phosphorous source suspended therein.

12. The controlled release nitrogen fertilizer gel composition as defined in claim 6 wherein said composition includes at least one secondary elemental agricultural nutrient suspended therein.

13. The controlled release nitrogen fertilizer gel composition as defined in claim 6 wherein said composition includes at least one agricultural micronutrient suspended therein.

14. The controlled release nitrogen fertilizer gel composition as defined in claim 6 wherein said composition includes at least one pesticidal component incorporated therein.

15. The controlled release fertilizer gel composition as defined in claim 6 wherein the amount of methylene diurea is sufficient to provide a pourable gel upon agitation of said gel composition.

16. The fertilizer gel composition as defined in claim 6 wherein said shearing action is combined with heating of the liquid medium to promote formation of the gel structure.

17. A process for producing a gel composition comprising:
subjecting a dry methylene urea composition in particulate form to a shearing action in a liquid medium in the absence of added thickener - suspending agents to form a gel structure;
said dry methylene urea composition including an amount of methylene diurea greater than the solubility limit of methylene diurea in the liquid medium and in an amount sufficient to provide said gel structure for suspending insoluble particles therein,
said shearing action comprising the application of force to the particles in said liquid medium including the application of sufficient force to the methylene diurea particles in said liquid medium to cause a reduction of the size of the methylene diurea particles to molecular size whereby the methylene diurea enters into solution and subsequently recrystallizes from said liquid medium to form said gel structure with the liquid medium.

18. The process as defined in claim 17 wherein the amount of methylene diurea in said dry methylene urea composition is sufficient to provide a pourable gel upon agitation of said gel composition.

19. The process as defined in claim 17 wherein said dry methylene urea composition contains particles which are insoluble in said liquid medium.

20. The process as defined in claim 17 where said dry methylene urea composition contains at least one component in addition to methylene diurea and which is at least substantially insoluble in said liquid medium.

21. The process as defined in claim 17 wherein at least one agriculturally active ingredient which is at least substantially insoluble in said liquid medium is added to said methylene urea composition and said liquid medium while said methylene urea composition is being subjected to said shearing action.

22. The process as defined in claim 17 wherein at least one agriculturally active ingredient which is at least substantially insoluble in said liquid medium is added to said dry methylene urea composition and said liquid medium prior to said methylene urea composition being subjected to said shearing action.

23. The process as defined in claim 17 wherein the amount of methylene diurea comprises an amount greater than the solubility limit of methylene diurea in the liquid medium and less than the amount which provides a solid composition upon subjecting said methylene urea composition to said shearing action in said liquid medium.

24. The process as defined in claim 17 wherein said shearing action is combined with heating of the liquid medium to promote formation of the gel structure.

* * * * *